United States Patent
Wurtzel et al.

(10) Patent No.: US 7,533,182 B2
(45) Date of Patent: May 12, 2009

(54) PORTABLE SCREENING ROOM

(75) Inventors: Yitzchak Wurtzel, Far Rockaway, NY (US); Chris Beauvois, Brooklyn, NY (US); Ilya Rozenblat, Woodmere, NY (US)

(73) Assignee: Starz Media, LLC, Englewood, CO (US)

( * ) Notice: Subject to any disclaimer, the term of this patent is extended or adjusted under 35 U.S.C. 154(b) by 442 days.

(21) Appl. No.: 11/039,927

(22) Filed: Jan. 24, 2005

(65) Prior Publication Data

US 2006/0164422 A1 Jul. 27, 2006

(51) Int. Cl.
*G06F 15/16* (2006.01)

(52) U.S. Cl. ................. 709/231; 709/238; 709/246; 709/248; 717/120; 717/171

(58) Field of Classification Search ......... 709/231–250; 717/100–125, 168–178
See application file for complete search history.

(56) References Cited

U.S. PATENT DOCUMENTS

| | | | | |
|---|---|---|---|---|
| 5,712,976 | A * | 1/1998 | Falcon et al. | 725/115 |
| 5,805,821 | A * | 9/1998 | Saxena et al. | 709/231 |
| 6,611,822 | B1 * | 8/2003 | Beams et al. | 706/11 |
| 6,789,105 | B2 * | 9/2004 | Ludwig et al. | 709/204 |
| 6,898,642 | B2 * | 5/2005 | Chafle et al. | 709/248 |
| 7,047,279 | B1 * | 5/2006 | Beams et al. | 709/204 |
| 7,047,308 | B2 * | 5/2006 | Deshpande | 709/232 |
| 7,124,164 | B1 * | 10/2006 | Chemtob | 709/204 |
| 7,143,428 | B1 * | 11/2006 | Bruck et al. | 725/37 |
| 7,174,385 | B2 * | 2/2007 | Li | 709/231 |
| 2002/0143855 | A1 * | 10/2002 | Traversat et al. | 709/202 |
| 2002/0152271 | A1 * | 10/2002 | Chafle et al. | 709/204 |
| 2003/0212710 | A1 * | 11/2003 | Guy | 707/104.1 |
| 2004/0143630 | A1 * | 7/2004 | Kaufmann et al. | 709/205 |
| 2004/0153504 | A1 * | 8/2004 | Hutchinson et al. | 709/204 |
| 2005/0033855 | A1 * | 2/2005 | Moradi et al. | 709/231 |
| 2006/0053209 | A1 * | 3/2006 | Li | 709/217 |
| 2006/0069800 | A1 * | 3/2006 | Li | 709/232 |
| 2006/0080454 | A1 * | 4/2006 | Li | 709/231 |
| 2007/0088813 | A1 * | 4/2007 | Floyd | 709/223 |

* cited by examiner

*Primary Examiner*—Wei Y Zhen
*Assistant Examiner*—Matthew J Brophy
(74) *Attorney, Agent, or Firm*—Townsend and Townsend and Crew LLP (57) ABSTRACT

A method and system are provided for screening media segments received from at least one originator. The method includes receiving at least one media segment from an originator, providing the media segment to at least one screener, associating feedback from the at least one screener with the at least one segment, thereby obtaining associated feedback, and delivering the associated feedback regarding the at least one segment to the originator of the media segment. The feedback provided to the originator is input by a screener using a portable screening room. The system for screening media segments includes an interface enabling communication between the originator of the media segment and at least one screener screening the media segment and a portable screening room used by the at least one screener to associate feedback with the media segment that is then sent to the originator.

13 Claims, 11 Drawing Sheets

PORTABLE SCREENING ROOM

BACKGROUND OF THE INVENTION

1. Field of the Invention

This invention relates generally to a method and system for screening media segments. More specifically, this invention relates to associating feedback from at least one screener with a media segment received from at least one originator to obtain associated feedback and providing the associated feedback back to the originator.

2. Discussion of the Background

Screening involves the viewing of media segments on computer screens by stakeholders, such as producers, coordinators, managers or clients (among others). The purpose of screening is to enable review and approval by producers, coordinators, managers, and clients (hereafter "stakeholders") for subsequent integration into an animated production. One purpose of screening is so that the stakeholders can guarantee that media segments received from remote artists (e.g., artists not located at a central facility) satisfy the requirements of the initial project as supplied to each artist. Additionally, the stakeholders review the media segments for sufficient quality and to make sure that the media segments fit seamlessly within the total animation production.

In the past, screeners reviewed media segments individually, without interacting with other screeners. Alternatively, multiple screeners may be used in a cooperative screening process. However, when multiple screeners are used, the screeners are generally located in a single physical facility, thereby enabling physical cooperation.

Screeners may obtain physical media (such as, for a non-limiting example, a digital versatile disc (DVD) mini-disc DV tape, or a video CD) through a physical delivery means such as mail or overnight package delivery. However, these and other methods of physical media delivery are time consuming and expensive.

Alternatively, current methods for transmission of media segments over the Internet may be used, but these methods usually involve file transfer protocol (FTP) or streaming media segments. FTP requires the transmission of the entire file before the media may be screened. Streaming media segments permits viewing by the intended receiver as the content originates from an appropriate server across the network.

Figure 1:
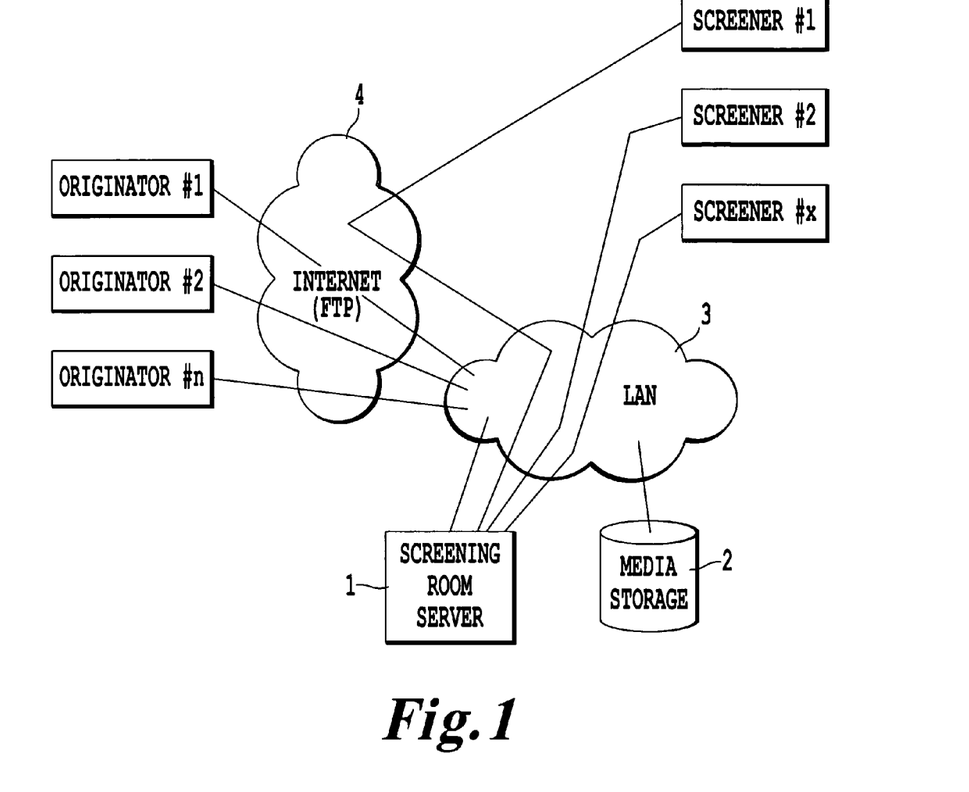
FIG. 1 illustrates a conventional system for screening media segments.

As illustrated in FIG. 1, originator #1—originator #N, such as artists, FTP data to a central screening room server 1, and screener #1—screener #X access the central screening room server 1 over a network, such as the LAN 3 or internet 4, to download the contents of the central screening room server 1 to their computer. Screener #1—screener #X then use a media player, such as, for a non-limiting example, QuesTime, Real-Player, Windows Media Player, or the like to display the media segments downloaded from the central screening room server 1 on their individual computers. Once the screeners have screened the media segments, comments regarding the segments and the segments are subsequently uploaded by the screeners to the central screening room server 1 for further action by the originator #1—originator #N (such as revision) and/or for storing in a centrally located media storage device 2 for downstream processing, archival, and incorporation into the media production.

The current method of screening using FTP suffers many disadvantages. While the Internet is used for electronic transmission of content and FTP is employed, media segments may encounter transmission delays due to insufficient bandwidth and poor quality of service, for example. The problems associated with the transmission delays and quality of service are exaggerated when dealing with media segments since there is an extremely large amount of data involved with transmitting media segments and there is a need for the guaranteed delivery of the entire contents of the media segment. These problems render FTP relatively inefficient for use with high resolution multimedia segments. High resolution multimedia segments used in the animation production environments are very large because compression cannot be used since compression causes loss of data content.

Where it is desired that multiple screeners view media segments together, the multiple screeners must be connected to a common LAN with a central screening room server. Otherwise, screeners do not have the necessary equipment or facilities for coordinating the viewing activity, and will not be able to interact meaningfully based on specific portions of the media to be screened.

Current methods also require a homogeneous computing environment for screener devices, and the central screening room server assumes a common operating system and media player across all users. Without these assumptions, it is difficult to synchronize the playing of media segments encoded for various media players, and the visual impact presented by each brand of media player (or even a version of the media player) is unique, which results in a different viewing experience even for identical media segments for each screener.

Moreover, current methods for associating screener comments and content are not formalized. Informal methods (e.g., voice communication), associated text files, or scribbled notes are used to communicate with the originators. These informal methods require subsequent processing to accomplish uniformity so that an aggregate view may be presented with organized comments that can be used for subsequent corrective action, as necessary.

SUMMARY OF THE INVENTION

The present invention enables multiple physically dispersed screeners (e.g. the stakeholders) to view common media segments in a coordinated manner without using a central screening server. Additionally, the present invention is not dependent upon connection of the screeners to a common local area network (LAN). Screeners may also use numerous different technologies to view the media segments, such as UNIX workstations, Apple computers, or personal computers using a Microsoft operating system, for example. These technologies are intended to be examples, and are not limiting of the present invention.

A further purpose of the invention is to enable the fast movement of media segments over the Internet from originators (e.g., the artists) to multiple screeners' computers, where the originators connect to the Internet through consumer market quality broadband access. Additionally, the invention facilitates the return of the media segments and the associated screeners' comments to the original artists and to media repositories for downstream processing.

These and other objects and purposes of the invention may be achieved using a method for screening media segments that includes receiving at least one segment from at least one originator, providing the at least one segment to at least one screener, associating feedback from the at least one screener with the at least one media segment, thereby obtaining associated feedback, and transmitting the associated feedback to the at least one originator. This method may be implemented using a system for screening media segments including at least one intelligent interface (hereinafter, interface) for communicating between at least one originator and at least one screener over a network and at least one portable screening room that associates feedback from at least one screener with the media segment, thereby providing associated feedback. The present invention may be used in a system such as the Global Animation System in U.S. application Ser. No. 10/781,785, the entire contents of which are incorporated herein by reference.

It is to be understood that both the foregoing general description of the invention and the following detailed description are exemplary, but are not restrictive, of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 2:
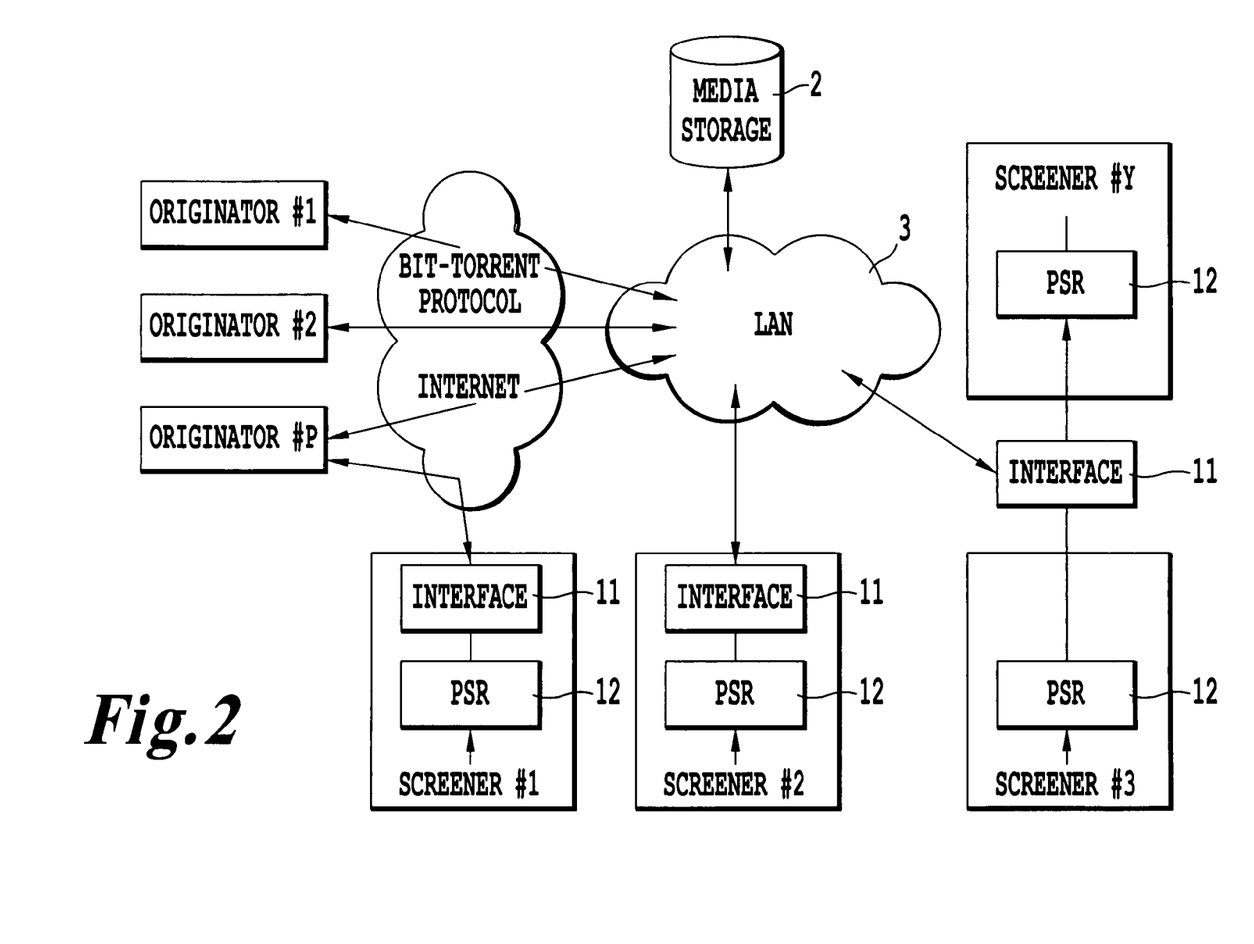
FIG. 2 illustrates a non-limiting example of a system for screening media segments according to the present invention.

Referring now to the drawings, wherein like reference numerals designate identical or corresponding parts throughout the several views, FIG. 2 illustrates a non-limiting example of the present invention. FIG. 2 illustrates a network, such as a LAN 3 or the Internet 4, that is used to connect originator #1—originator #P, a media storage device 2, and screener #1—screener #Y. Originators (e.g. originator #1—originator #P) provide media segments over a network to a system for screening media segments including an interface 11 and a portable screening room 12. The portable screening room 12 is used by screeners (e.g. screener #1—screener #Y) to associate feedback with the media segments. The media segments can include, but are not limited to, animation data that is being produced for use in an animation film that requires screening by at least one screener, such as screener #1—screener #Y illustrated in FIG. 2. The media storage device 2 is used to store data including, but not limited to, media segments received from originators, such as originator #1—originator #P and associated feedback from screeners such as screener #1—screener #Y.

In FIG. 2, an interface is included in the blocks labeled screener #1 and screener #2, whereas screener #3 and screener #Y are connected to a common interface 11 that is not included in the blocks labeled screener #3 and screener #Y. It should also be noted that while FIG. 2 illustrates only a single media storage device 2, multiple storage devices could be used and located at different locations around the world. FIG. 2 also illustrates that screeners may directly access content from originators over the Internet. For example, originator #P is directly connected to screener #1 via the Internet. Alternatively, screeners and originators may communicate over a LAN, such as the LAN 3 illustrated in FIG. 2.

Bit-torrent protocol may be used to broadcast "play blast" media segments from originators to screeners quickly. Bit-torrent is designed for sharing files on peer-to-peer networks. Bit-torrent compensates for the usual asymmetry (broadband download and narrowband upload) and bandwidth provided to residential internet users. In the Global Animation Studio environment, originators and remote screeners would usually connect via residential internet access arrangements. The bit-torrent protocol reduces the amount of time required for one-to-many transmissions from originators. The protocol breaks up large media files into small segments (e.g., 16 kilobytes each) and distributes these segments concurrently through multiple intermediaries, which may include the screeners' computers, as well as other computers.

Alternatively, originators may upload the segments to a central facility (e.g., media storage device 2), from which another protocol, such as Konspire2Be (K2B), is used to broadcast the content to the screeners. K2B is a protocol that enables the efficient distribution of very large files to multiple destinations. K2B is efficient when the data source and many of the data destinations use business oriented broadband services, where the upload and download capacities are symmetric. In general, K2B moves entire files, so that the number of destinations receiving the files expands in a geometric progression.

It should also be noted that if improvements were made to Internet bandwidth (such as, for a non-limiting example, Internet2), and costs are significantly reduced in consumer-grade symmetric Internet connectivity, bit-torrent could be replaced by other protocols that enable efficient use of asymmetric Internet connections for uploads from one-to-many. Any protocol that enables efficient transfer of files between originators and screeners may be used as part of the present invention.

Figure 3:
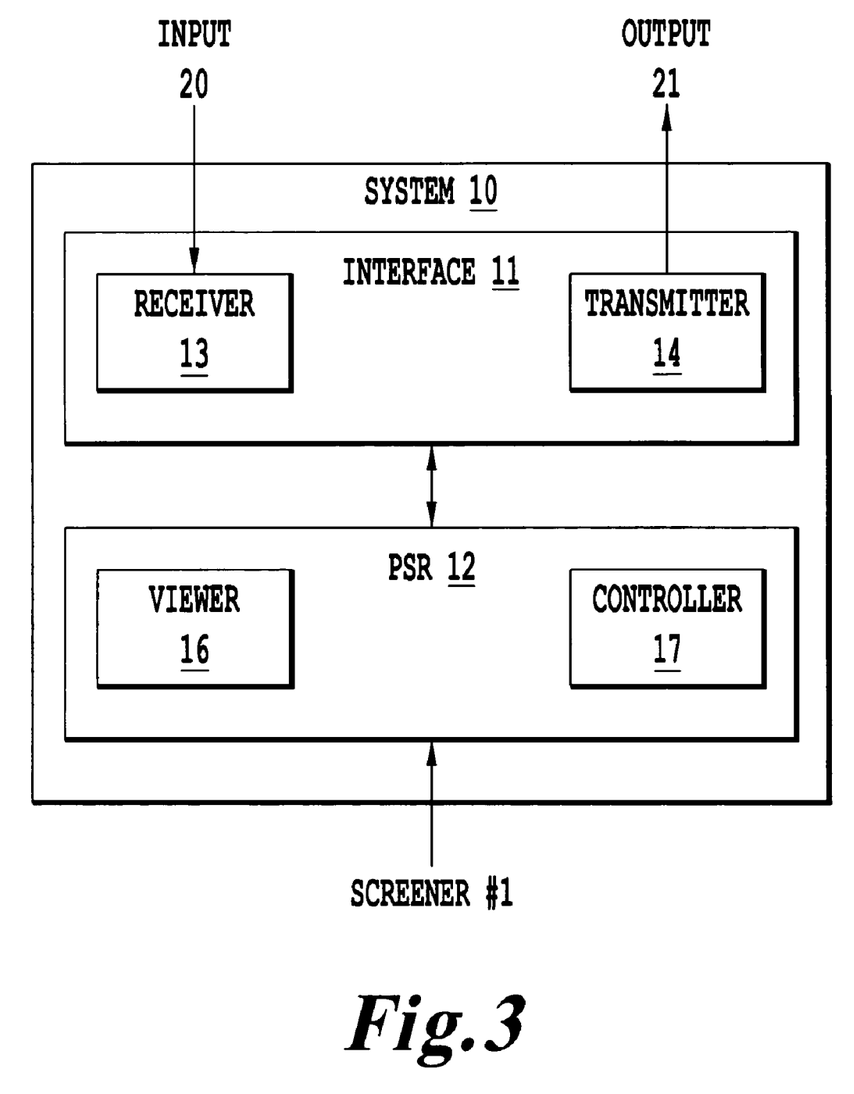
FIG. 3 illustrates a first exemplary embodiment of a system for screening media segments using the first exemplary embodiment of the present invention.

FIG. 3 is block diagram of the first exemplary embodiment of a system 10 for screening media segments. As illustrated in FIG. 3, the system for screening media segments according to the first exemplary embodiment includes an interface 11 for communicating between at least one originator and at least one screener. More specifically, the interface 11 includes a receiver 13 and transmitter 14. The receiver 13 and transmitter 14 are configured to receive input 20 from a network and transmit output 21 over a network, respectively. The input 20 received by the receiver 13 includes, but is not limited to, a media segment received from either an originator or a media storage device over a network. In this first exemplary embodiment of system 10, the transmitter 14 and receiver 13 are configured to transmit and receive media segments over a network using bit-torrent protocol, K2B protocol, or another suitable protocol, as discussed above.

The interface 11 is configured to process at least one media segment received via the receiver 13 from an originator and/ or media storage device. As illustrated in FIG. 3, the interface 11 is also configured to process data received from the PSR 12. The interface 11 is configured to process data in various ways depending on, but not limited to, where the data is received from, the format of the data, and any metadata associated with the data. The interface 11 may also be configured to determine what data is provided to the PSR 12 of system 10. For example, automatic determination of the data may be performed using metadata associated with the data received via receiver 13 from the media storage device or originator. Associated metadata could be used to identify the data as ready for screening, as a particular version of the data, or to identify the media segment as belonging to a specific animation project. Media segments belonging to certain animation projects may require screening by specific screeners. Alternatively, the interface 11 may determine which data is sent to the PSR 12 in response to a request sent from the PSR 12 that could be initiated either automatically by the PSR 12 or by screener #1 using the PSR 12 shown in FIG. 3. Further, the interface 11 of system 10 can be configured to determine what information is output over a network by the transmitter 14.

In FIG. 3, system 10 includes the PSR 12 in addition to interface 11. The PSR 12 is used by at least one screener to associate feedback with the at least one media segment being screened, thereby obtaining associated feedback. In FIG. 3 PSR 12 is used by screener #1 to screen the media segments provided to the PSR 12 by the interface 11. The PSR 12 includes a viewer 16 and controller 17. It is noted that components of the PSR 12 illustrated in FIG. 3 are exemplary and not meant to be limiting.

Figure 4:
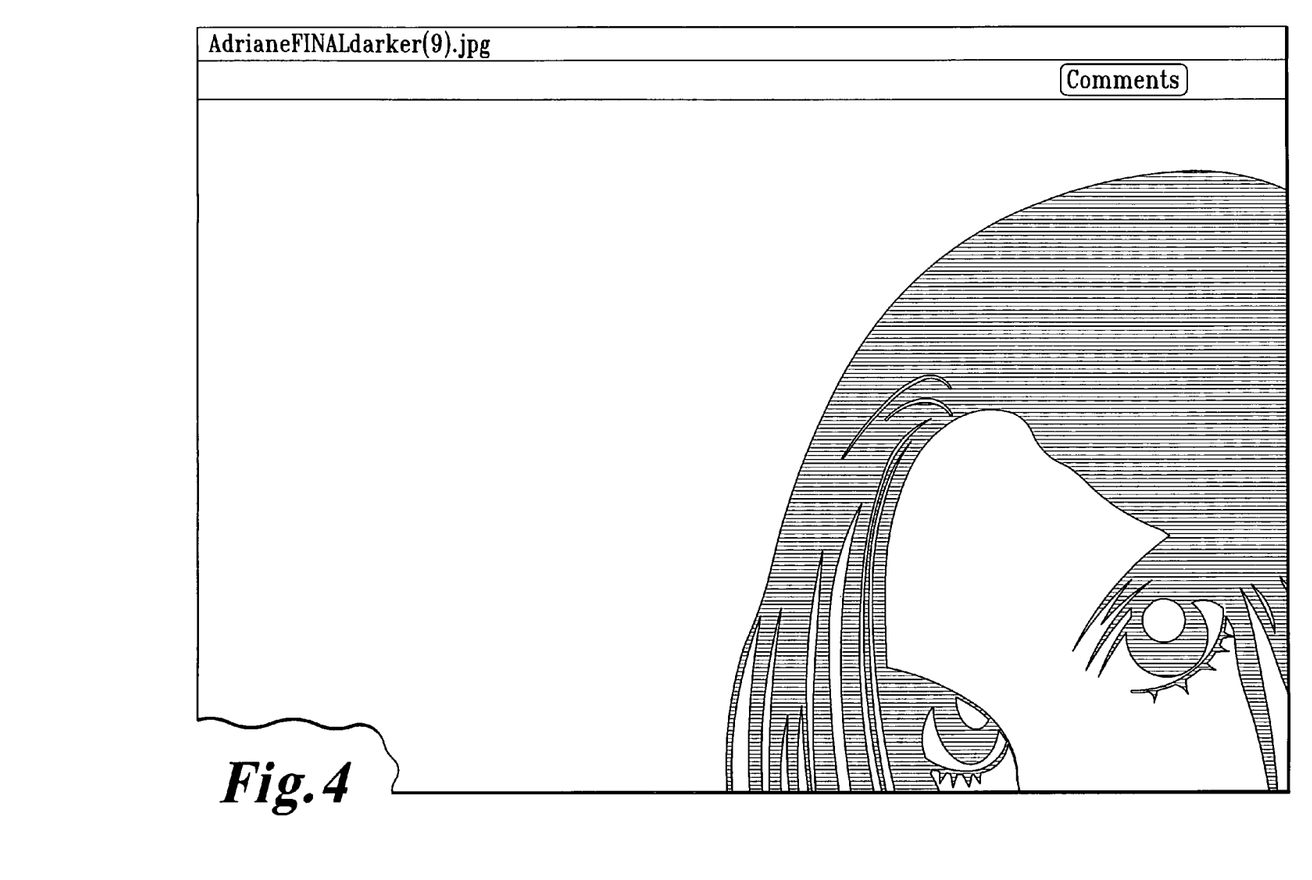
FIG. 4 illustrates a visual display of a single frame of a media segment provided by a PSR.

The viewer 16 is used to visually display the media segment being screened by screener #1 using the PSR 12. The viewer 16 is configured to visually display the media segment received from the interface 11 to allow different screeners (each using a PSR 12 of the first exemplary embodiment) to view a media segment in the same format and conditions. Thus, screeners located at different remote locations will share the same experience when viewing the media segment using the viewer 16 of PSR 12. FIG. 4 illustrates a non-limiting example of a visual display of a single frame of a media segment using viewer 16.

As discussed above, screeners have used a variety of media players including QuesTime, RealPlayer, Windows Media Player, or the like to display the media segments on their computers. However, the use of different media players or even different versions of media players may result in a different viewing experience for each screener. This difference in viewing conditions often results from the differences between media players, independent of the media being screened. This undesirable result is avoided by the first exemplary embodiment of the present invention, since a common viewer is used by each screener. Accordingly, the viewer 16 of the first embodiment enables a uniform screening experience for each screener. As a result, the PSR 12 guarantees that the screeners' feedback relates to the content of the media segments, and prevents the feedback from being related to playback anomalies.

The PSR 12 shown in FIG. 3 may also include a controller 17. The controller 17 is configured to control the viewing of the media segment being visually displayed on the viewer 16. The controller 17 may be configured to provide a variety of control operations including, but not limited to, play, stop, pause, rewind, fast forward, zoom, and play frame-by-frame. These control functions provided by the controller enable the screener to more effectively screen a media segment. For example, a zoom function of a controller could be used to focus in on one single portion of a frame of a media segment to more precisely determine what could be improved about a specific characteristic of an animation frame. For example, screener #1 using the controller 17 of PSR 12 could zoom in on a specific feature of a frame such as the eye shown in FIG. 4 if a closer view is desired by screener #1.

Figure 5:
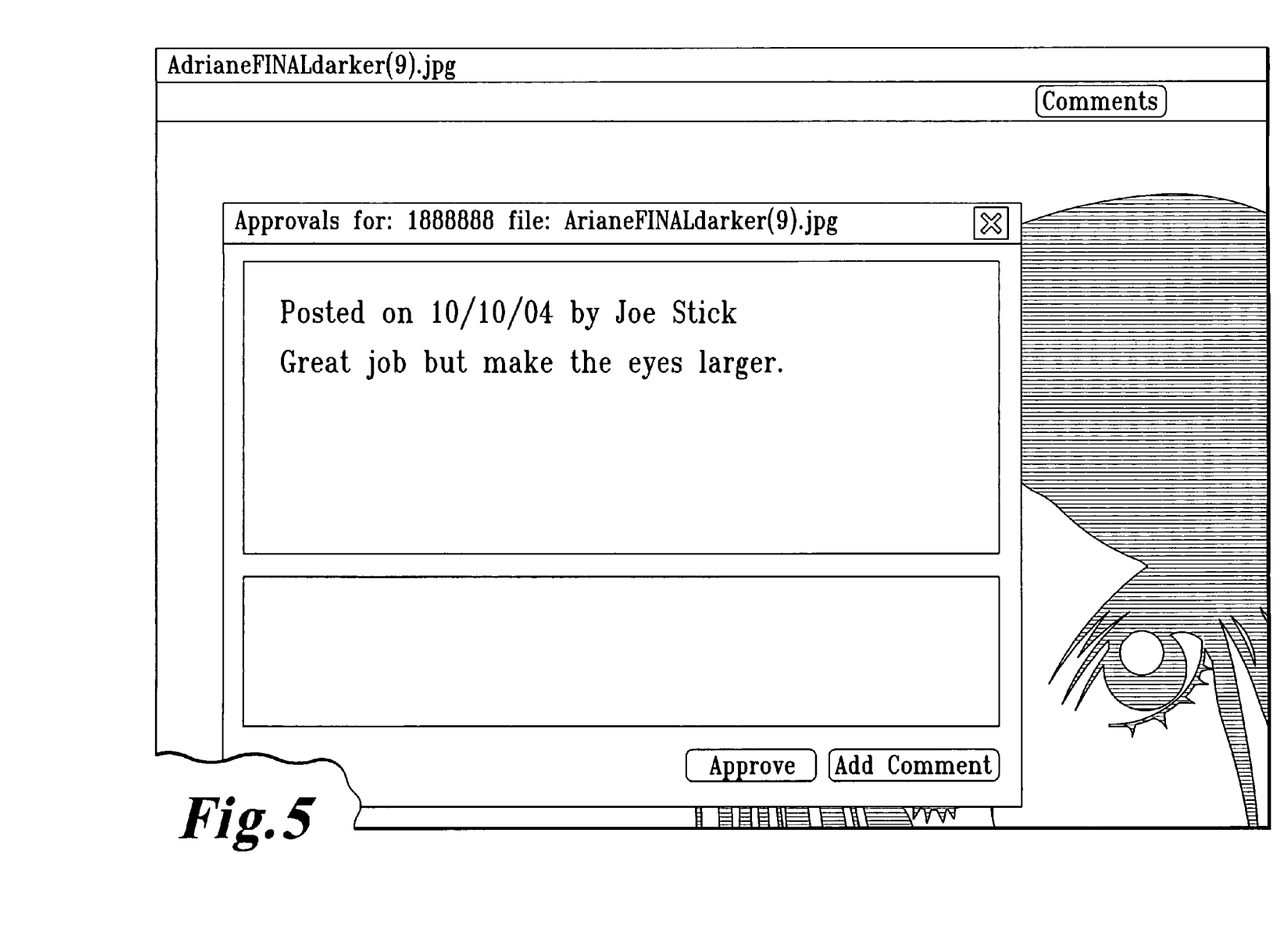
FIG. 5 illustrates an exemplary example of associated feedback related to the single frame of the media segment illustrated in FIG. 4.

The PSR 12 is configured to allow screener #1 to associate feedback with the media segment being screened. For example, the PSR 12 may include a variety of macros or buttons to enable the user to insert feedback such as the comments button illustrated in the top right corner of FIG. 4. In the non-limiting example of FIGS. 4 and 5, a screener may open a new window by clicking on the comments button, as shown in FIG. 5. The window of FIG. 5 enables association of comments with the media segment illustrated in FIG. 4. For example, as shown in FIG. 5, a screener has input feedback intended for the originator requesting that the eyes of a woman be made larger. The PSR 12 is configured to associate the editing comments of the screener with the media segment. For example, the PSR 12 can be configured to produce a text file with comments regarding the entire media segment, or alternatively, to associate the editing comments regarding each specific frame of a media segment to the specific frame of the media segment. These methods of association are intended to be exemplary, and non-limiting of the present invention.

In the past, once the screeners had screened the media segments, comments regarding the media segments were subsequently uploaded by the screeners to the central screening room server 1, as illustrated in FIG. 1, for further action by the originators (such as revision) and/or for storing in a centrally located media storage device for downstream processing, archival, and incorporation into the media production. However, the PSR 12, as shown in FIG. 3, is configured to permit the screener to associate feedback directly with the media segment as illustrated in FIG. 5. Thus, the screeners can provide the originator with more effective feedback since the screeners' comments can be directly associated with the media segment.

The PSR 12 illustrated in FIG. 3 can also be configured to generate a screened data file that includes, but is not limited to, the original media segment and associated feedback regarding the media segment. As shown in FIG. 3, the PSR 12 can provide the screened data file to the interface 11. The PSR 12 can also be configured to associate metadata to the media segment used to further instruct the interface 11 or the at least one originator who will eventually receive the associated feedback. In other words, the PSR 12 can produce a screened data file that can be transmitted to the originator or media storage device via the interface 11 as discussed above. When the screened data file is transmitted to a media storage device, the originator retrieves the screened data file from the media storage device. The screened data file provides the originator with the associated feedback, thereby enabling the originator to take appropriate actions based on the associated feedback.

Figure 6:
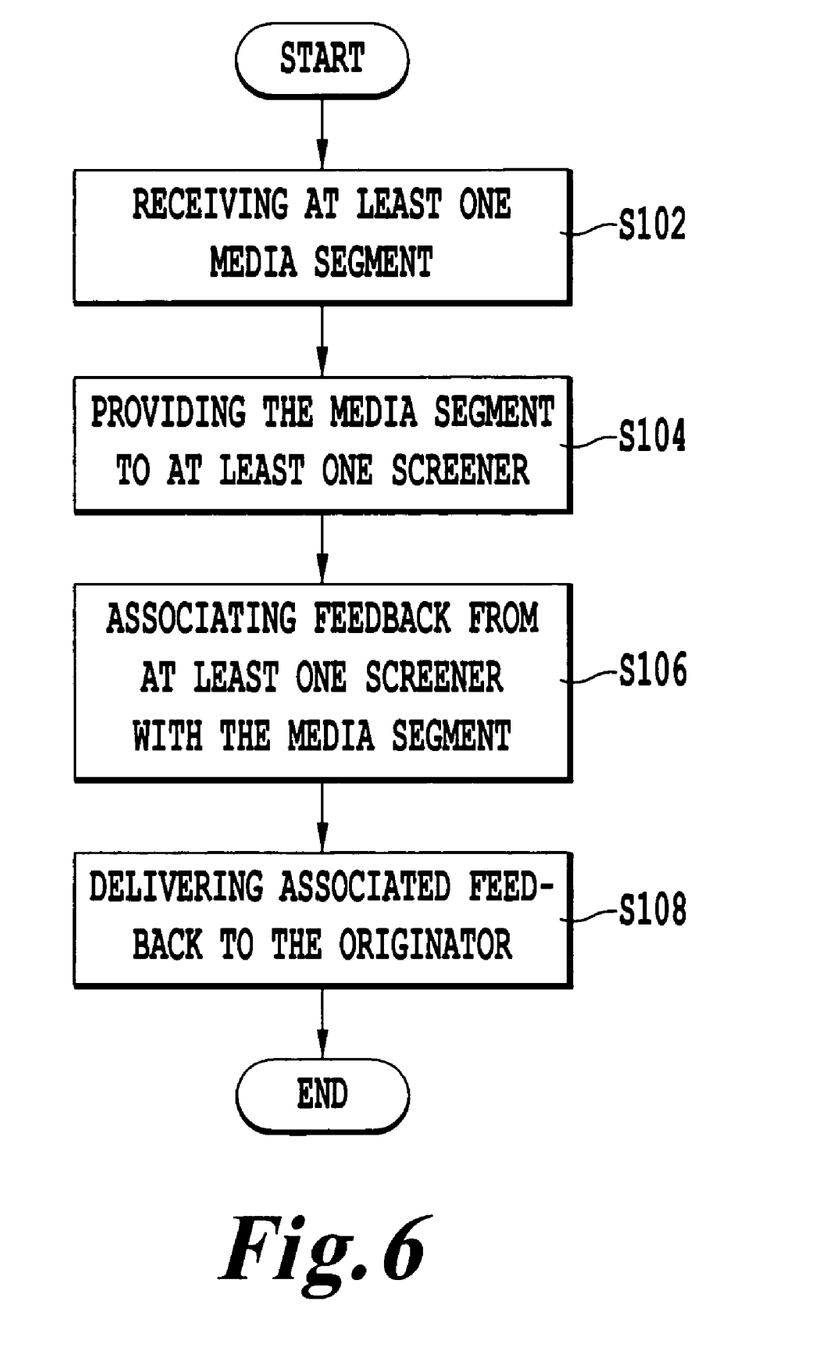
FIG. 6 illustrates an exemplary method for screening media segments.

FIG. 6 illustrates an exemplary method for screening media segments using the system 10 of the first exemplary embodiment as described above. The method illustrated in FIG. 6 includes receiving a media segment to be screened S102 from at least one originator; providing the media segment to at least one screener S104; associating feedback from the at least one screener with the media segment S106, thereby obtaining associated feedback; and providing the associated feedback back to the at least one originator S108.

As described above with respect to the first exemplary embodiment, the at least one media segment will be received from an originator who produced the media segment that requires screening. The originator may transmit the media segment for screening directly to the interface 11 or to a media storage device 2. If the originator transmits the media segment to the media storage device 2, the interface 11 can automatically download the media segment from the media storage device 2 or can alternatively download the media segment in response to a request submitted by a screener using a PSR 12. In either situation, step S102 is completed by the interface 11.

Once step S102 is completed, the media segment is processed by the interface 111 and provided to the at least one screener using a PSR 12 in step S104. Using the PSR 12, the screener associates feedback with the media segment in step S106.

In step S108, the associated feedback is provided back to the at least one originator. As discussed above, the screened data file generated by the PSR 12, which includes associated feedback, is provided to the interface 11 which then processes the data and instructs the transmitter 14 to deliver the screened data file to a proper location (e.g. back to the originator either directly or via the media storage device 2). A more detailed method for screening media segments will be explained later with reference to FIG. 10 and additional exemplary embodiments of the present invention.

Figure 7:
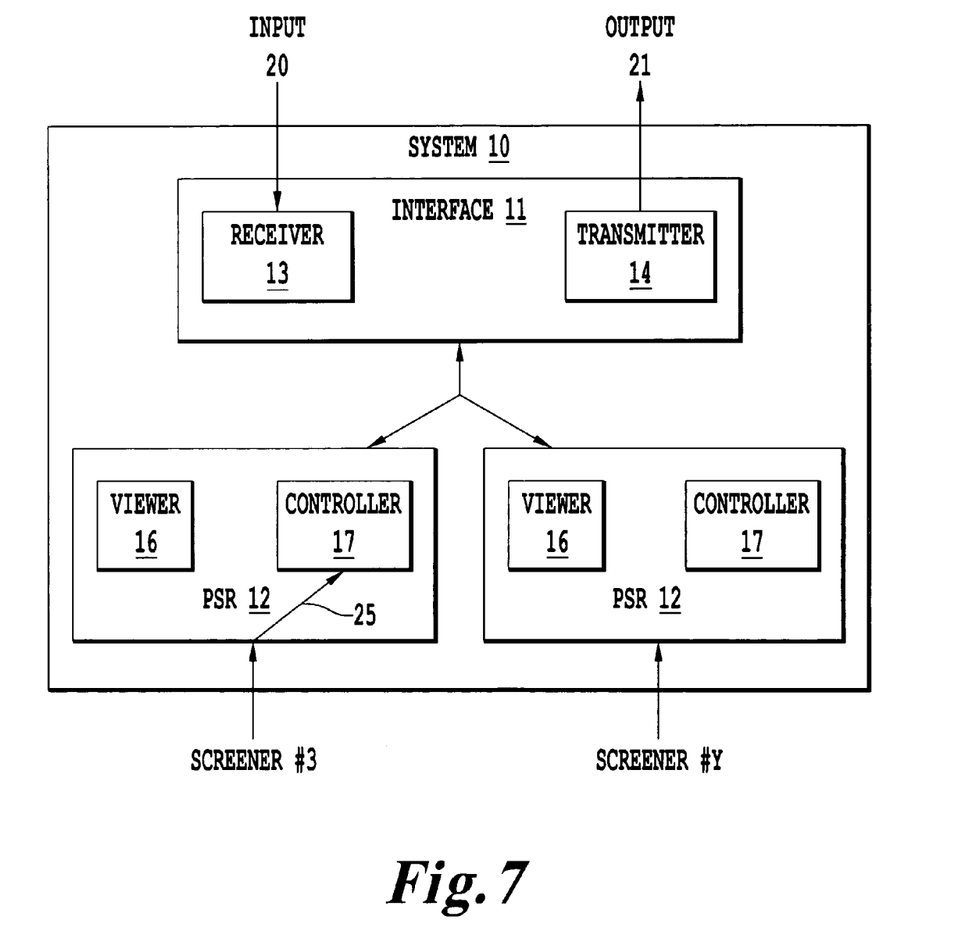
FIG. 7 illustrates a second exemplary embodiment of a system for screening media segments.

FIG. 7 represents a second exemplary embodiment of a system for screening media segments. In the second exemplary embodiment of the present invention, the interface 11 can be further configured to schedule and coordinate a concurrent viewing of at least one media segment between screener #3 and screener #Y. As shown in FIG. 2, screener #3 and screener #Y share an interface 11 that may be located separate from the PSRs 12 used by the respective screeners. As shown in FIG. 7, the interface 11 of system 10 provides and receives information to and from a PSR 12 used by screener #3 and a PSR 12 used by screener #Y.

Interface 11 can be configured to coordinate the concurrent viewing between at least two screeners in various ways including, but not limited to, time-coordinating the concurrent viewing or frame-sequencing the concurrent viewing. The interface 11 may time-coordinate the viewing, meaning that screener #3 and screener #Y each using a PSR 12 in two different remote locations are viewing the media segment at a concurrent time. The interface 11 can be configured to ensure that the segment being viewed by screener #3 and screener #Y starts at the same time and is playing at the same speed. Thus, feedback provided by screener #3 and screener #Y can be easily coordinated or correlated based on time by the interface 11. This ensures, for example, that associated feedback regarding seconds 5 through 10 of the media segment received from screener #3 and screener #Y correspond to the same 5 second duration of the media segment.

The interface 11 can also be configured to frame-sequence the concurrent viewing. Frame-sequence coordinating the concurrent viewing ensures that both screener #3 and screener #Y are viewing and commenting on the same frame or frame sequence.

Further, the interface 11 can be configured to distribute control of the concurrent viewing of the media segment between at least two screeners. For example, as illustrated in FIG. 7, screener #Y is unable to input data to the controller 17 of the PSR 12 that screener #Y is using, whereas screener #3 is able to input control information to controller 17 of the PSR 12 screener #3 is using via line 25. Thus, according to the non-limiting example of the second exemplary embodiment illustrated in FIG. 7, the interface 11 provides screener #3 with complete control of the concurrent viewing (e.g. screener #3 determines whether to play, stop, pause, rewind, fast forward, zoom, or play frame-by-frame the media segment being viewed by both screener #3 and screener #Y). In the second exemplary embodiment, even though screener #Y does not have control over the viewing, screener #Y still associates feedback with the media segment using the PSR 12. This second exemplary embodiment is especially effective in a situation in which there is a hierarchy of screeners. Screener #3, for example, is able to control the viewing of the media segment, thereby directing screener #Y to focus or comment on certain aspects of the media segment.

The interface 11 can also be configured to process the associated feedback provided by the PSR 12 used by each screener. As shown in FIG. 7, the interface 11 receives a screened data file from screener #3 and screener #Y. The interface 11 can be configured to process the two screened data files in a variety of manners. For example, interface 11 may combine the two screened data files into a single file. Alternatively, the interface 11 may process the data so that the originator can search for edited data from both screener #3 and screener #Y or search for comments only from one of screener #3 and screener #Y.

In the past, when multiple screeners were used in cooperative screening processes, it was generally necessary that the multiple screeners be located in a single physical facility, thereby enabling physical cooperation. The second exemplary embodiment of the present invention, as described with reference to FIG. 7, allows for cooperative screening between at least two screeners without the limitation of being in a single facility.

Figure 8:
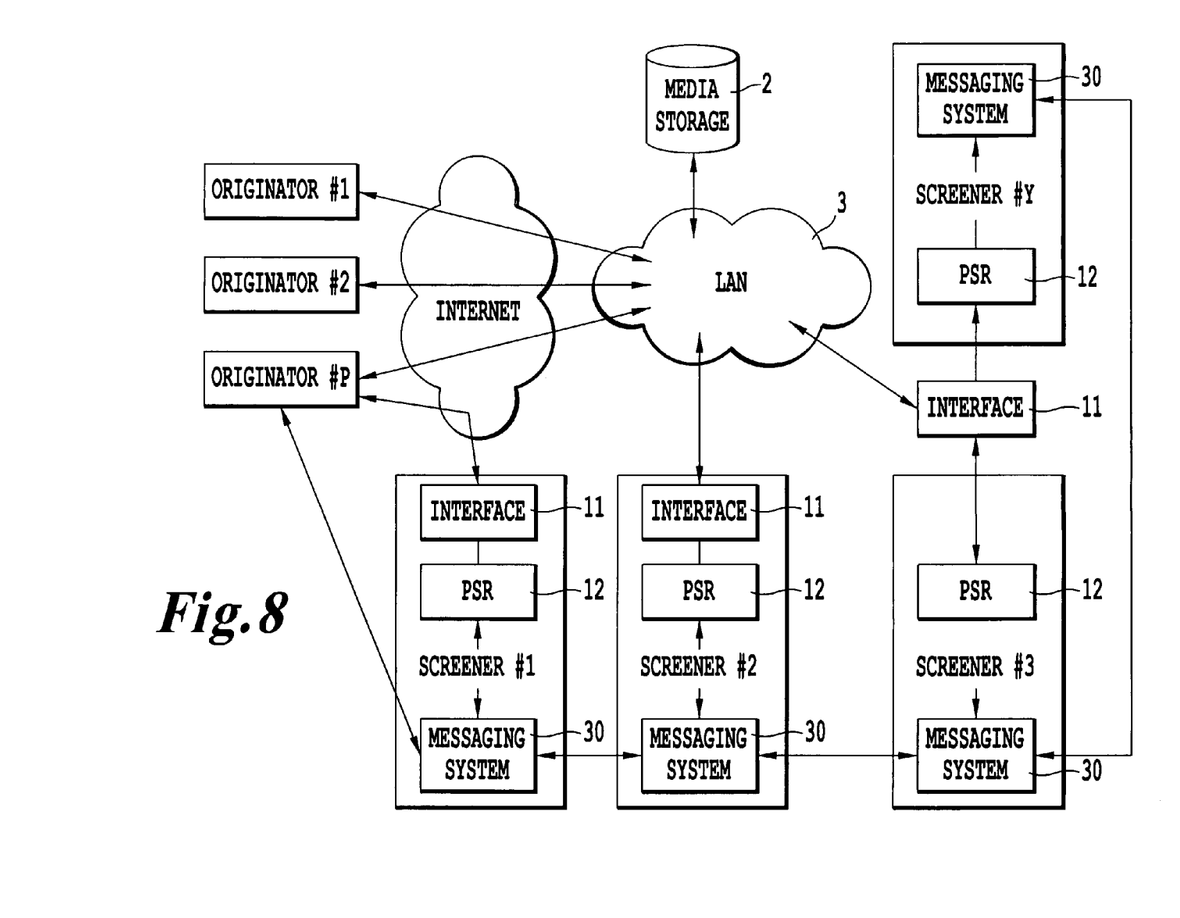
FIG. 8 illustrates a third exemplary embodiment of a system for screening media segments of the present invention.

A third exemplary embodiment of the present invention is illustrated in FIG. 8. The system used by each screener #1—screener #Y in FIG. 8 includes a PSR 12, and interface 11, and messaging system 30. The messaging system 30 can be configured to communicate messages between at least one originator (originator #P) and at least on screener (screener #1). Further, the messaging system 30 can also be configured to communicate messages between at least two screeners (screener #1 and screener #2). The messaging system 30 can be configured to transmit messages in a variety of formats including, but not limited to, text messaging, voice communications, and video communications. The messaging system 30 allows communication during the screening process that may provide immediate feedback to the originator, or alternatively permit multiple screeners to discuss the media segment being viewed before associating feedback with the media segment.

Figure 9:
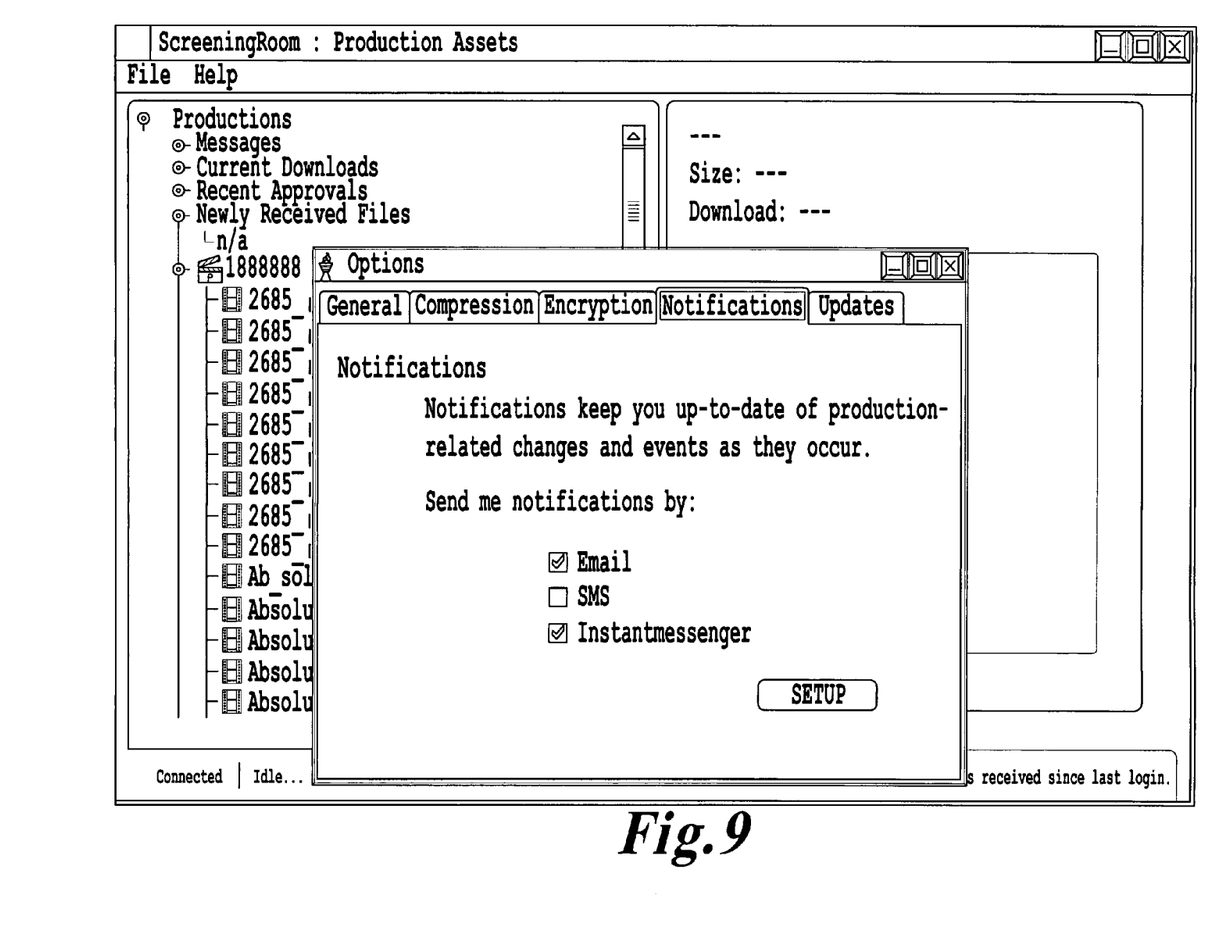
FIG. 9 illustrates a non-limiting example of a messaging system included in the third exemplary embodiment of the present invention.

Further, the messaging system 30 can be configured to notify an originator of a media segment that associated feedback pertaining to a screened media segment is available either from the interface 11 or the media storage device 2. FIG. 9 illustrates a non-limiting example of a messaging system 30 that permits the user to select the form of notification used by the messaging system 30. This notification alerts the originator that a media segment has been screened and that associated feedback is available. The messaging system 30 can also be configured to notify the originator that a concurrent screening is scheduled for a media segment.

Additionally, the messaging system 30 can be configured to notify at least one screener that a media segment has been received from an originator that requires screening. The notification from the messaging system 30 can then be used by the interface 11 to trigger an automatic download of a media segment to at least one PSR 12.

Figure 10:
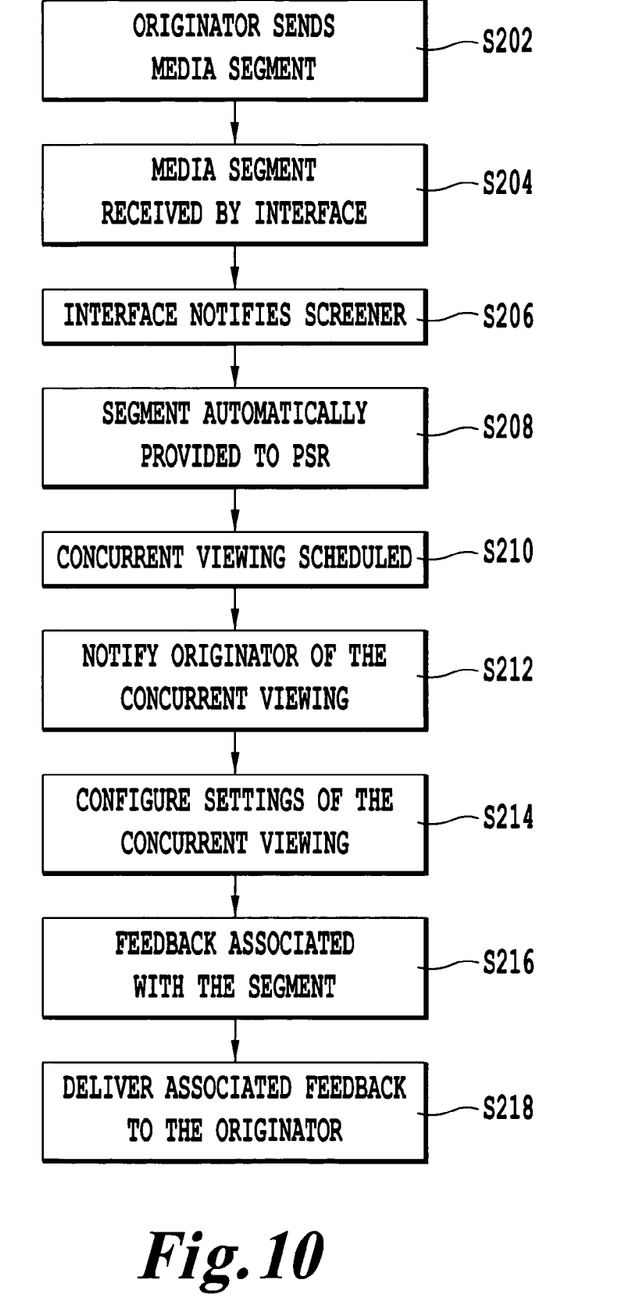
FIG. 10 illustrates a second exemplary method for screening media segments using a system with the features discussed in the first, second, and third exemplary embodiments of the present invention.

FIG. 10 illustrates a second exemplary method for screening a media segment including features of the first through third exemplary embodiments. The second exemplary method is initiated by the sending of a media segment to be screened by an originator in step S202. An interface 11 of the present invention receives the media segment via a receiver in step S204. The interface then notifies at least one screener that a media segment has been received in step S206 and the media segment is automatically provided to the PSR 12 of the at least one screener in step S208. In step 210 the interface 11 schedules a concurrent viewing of the media segment for at least two screeners using a PSR 12 in two different remote locations. The originator of the media segment is notified of the scheduled concurrent viewing for the submitted media segment in step S212. The interface 11 then configures the settings for the concurrent viewing in step S214. For example, the interface can determine which screeners will have control of the viewing and how the viewing will be conducted (e.g. time-sequence-coordinated or frame-sequence-coordinated). In step S216 the viewing is conducted and feedback is associated with the media segment being viewed. The associated feedback is then delivered back to the originator in step S218. The method including steps S202-S218 is then repeated as required or desired.

This invention may be implemented using a conventional general purpose computer or micro-processor programmed according to the teachings of the present invention, as will be apparent to those skilled in the computer art. Appropriate software can readily be prepared by programmers of ordinary skill based on the teachings of the present disclosure, as will be apparent to those skilled in the software art.

Figure 11:
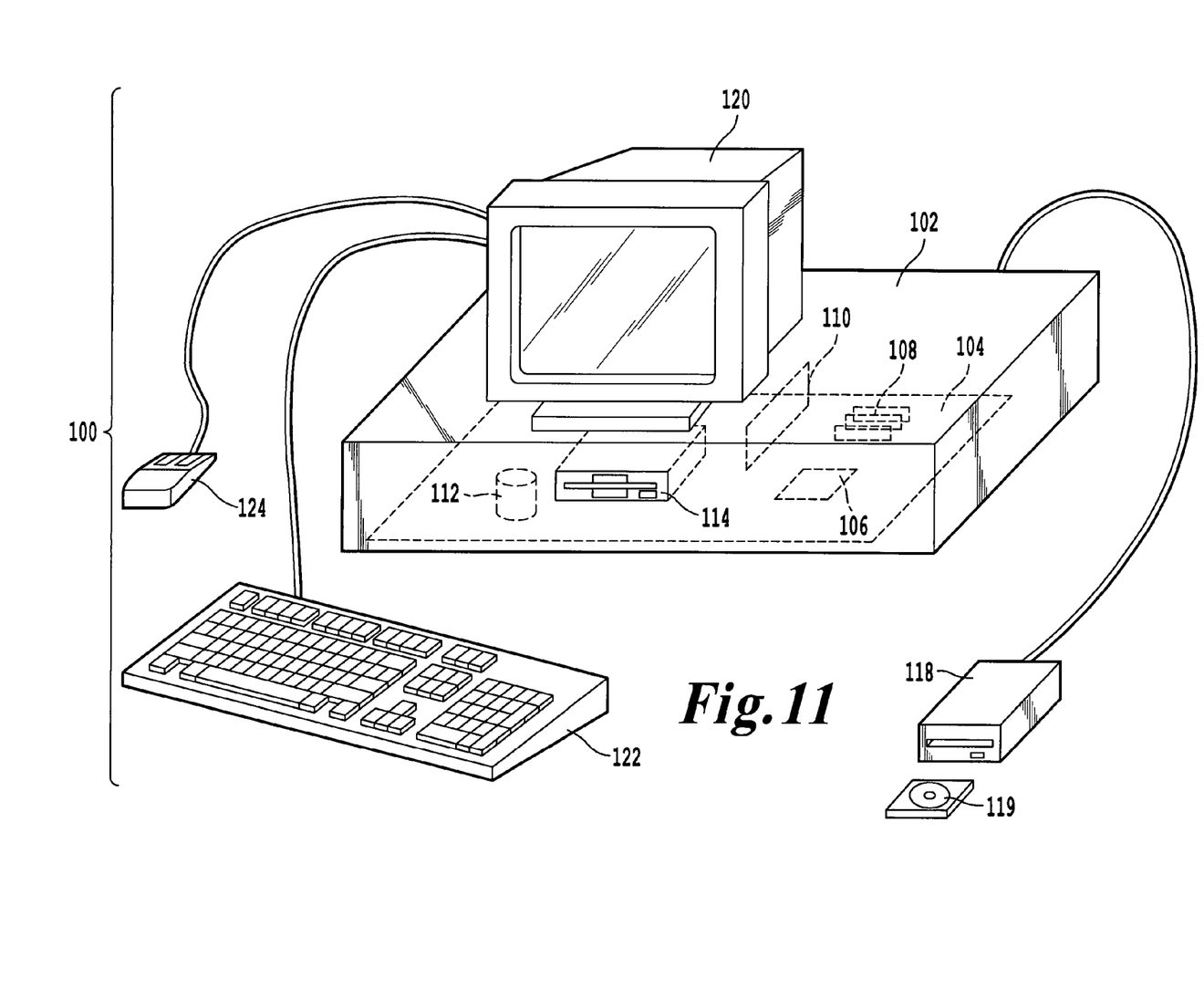
FIG. 11 illustrates a computer that may be used to implement the method and system of the present invention.

A non-limiting example of a computer 100 as shown in FIG. 11 may implement the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optical special purpose logic devices (e.g., ASICS) or configurable logic devices (e.g., GAL and reprogrammable FPGA). The computer 100 also includes plural input devices, (e.g., keyboard 122 and mouse 124), and a display card 110 for controlling a monitor 120. Additionally, the computer 100 may include a floppy disk drive 114; other removable media devices (e.g. compact disc 119, tape, and removable magneto-optical media (not shown)); and a hard disk 112 or other fixed high density media drives, connected using an appropriate device bus (e.g., a SCSI bus, an Enhanced IDE bus, or an Ultra DMA bus). The computer may also include a compact disc reader 118, a compact disc reader/writer unit (not shown), or a compact disc jukebox (not shown), which may be connected to the same device bus or to another device bus.

As stated above, the system includes at least one computer readable medium. Examples of computer readable media are compact discs 119, hard disks 112, floppy disks, tape, magneto-optical disks, PROMs (e.g., EPROM, EEPROM, Flash EPROM), DRAM, SRAM, SDRAM, etc. Stored on any one or on a combination of computer readable media, the present invention includes software for controlling both the hardware of the computer 100 and for enabling the computer to interact with a human user. Such software may include, but is not limited to, device drivers, operating systems and user applications, such as development tools. Such computer readable media further includes the computer program product of the present invention for performing the inventive method herein disclosed. The computer code devices of the present invention can be any interpreted or executable code mechanism, including but not limited to, scripts, interpreters, dynamic link libraries, Java classes, and complete executable programs. Moreover, parts of the processing of the present invention may be distributed for better performance, reliability, and/or cost. For example, plural contingencies can be calculated in parallel to determine portions of the uncertain costs simultaneously and the results summed at the end.

The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for screening contiguous video segments including at least one segment, the method comprising:
   receiving the at least one segment from at least one originator, wherein the at least one segment is pre-recorded and at least partially created by the at least one originator;
   storing the at least one segment with a media store, wherein the media store is configured to provide the at least one segment using a first peer-to-peer protocol, providing the at least one segment to a first screener at a first portable screening room, wherein the first screener receives information from the media store by passing information over a local area network (LAN) without passing information over the Internet;
   providing the at least one segment to a second screener at a second portable screening room using a second peer-to-peer protocol different from the first peer-to-peer protocol, wherein the second screener receives information by passing information over the Internet,
   scheduling a concurrent viewing of the at least one segment with at least the first and second screeners;
   synchronizing playback on both of the first and second portable screening rooms;
   associating feedback from at least one of the first and/or second screener with the at least one segment, thereby obtaining associated feedback; and
   delivering the associated feedback and the at least one segment to the at least one originator.

2. The method according to claim 1, wherein the associating includes associating metadata with the at least one segment.

3. The method according to claim 1, wherein the associated feedback includes feedback input by at least two screeners regarding the at least one segment.

4. The method according to claim 1, further comprising:
   notifying the at least one screener that the at least one segment has been provided.

5. The method according to claim 1, wherein the synchronizing step includes time-coordinating a concurrent viewing.

6. The method according to claim 1, wherein the synchronizing step includes frame-sequence-coordinating the concurrent viewing.

7. The method according to claim 1, wherein the first peer-to-peer protocol uses a bit-torrent protocol.

8. The method according to claim 1, wherein the second peer-to-peer protocol uses a K2B protocol.

9. A computer readable medium storing program instructions for execution on a computer system, which when executed by the computer system causes the computer system to perform a method for screening contiguous video segments including at least one segment, the computer readable medium comprising code for:
   receiving the at least one segment from at least one originator, wherein the at least one segment is pre-recorded and at least partially created by the at least one originator;

providing the at least one segment to a first screener at a first screening room, wherein the first screener receives information by passing information over a local area network (LAN) using a first network protocol without passing information over the Internet;

providing the at least one segment to a second screener at a second screening room, wherein the second screener receives information by passing information over the Internet using a second network protocol different from the first network protocol;

synchronizing playback on both of the first and second screening rooms;

associating feedback from at least one of the first and/or second screener with the at least one segment, thereby obtaining associated feedback; and delivering the associated feedback to the at least one originator.

10. The method according to claim 1, wherein the associating step prevents the associated feedback from being related to playback anomalies.

11. The method according to claim 1, wherein the delivering step includes delivering the associated feedback and the at least one segment to a media store located across the Internet from the at least one originator, wherein the at least one originator has access to the media store.

12. The method according to claim 1, wherein at least one of the first and second portable screening rooms allows zooming of the at least one segment.

13. The method according to claim 1, wherein the first and second portable screening rooms allow distributed control of the synchronized playback whereby a control action performed by the first screener affects playback on the second portable screening room.

* * * * *